L. BROWN.
PRECISION GAGE.
APPLICATION FILED JUNE 21, 1919.
1,380,945.
Patented June 7, 1921.
4 SHEETS—SHEET 3.
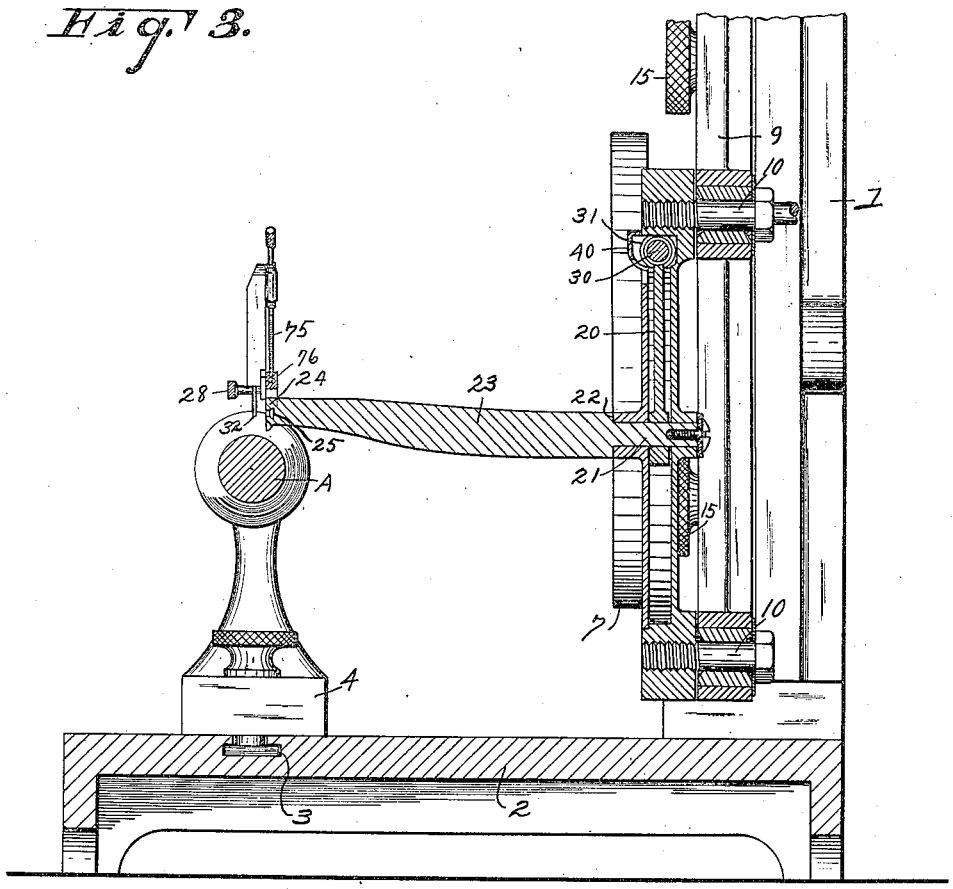
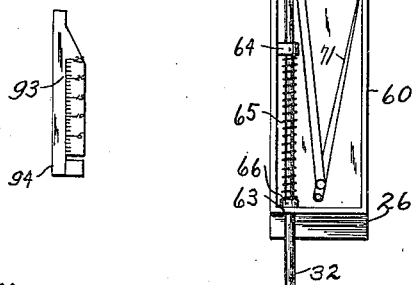
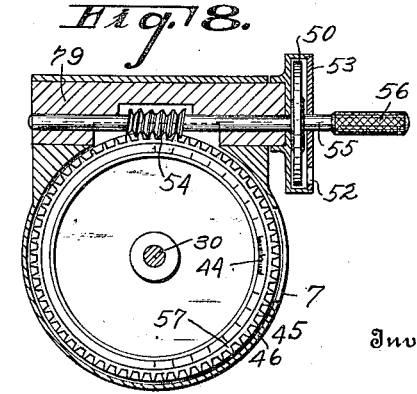

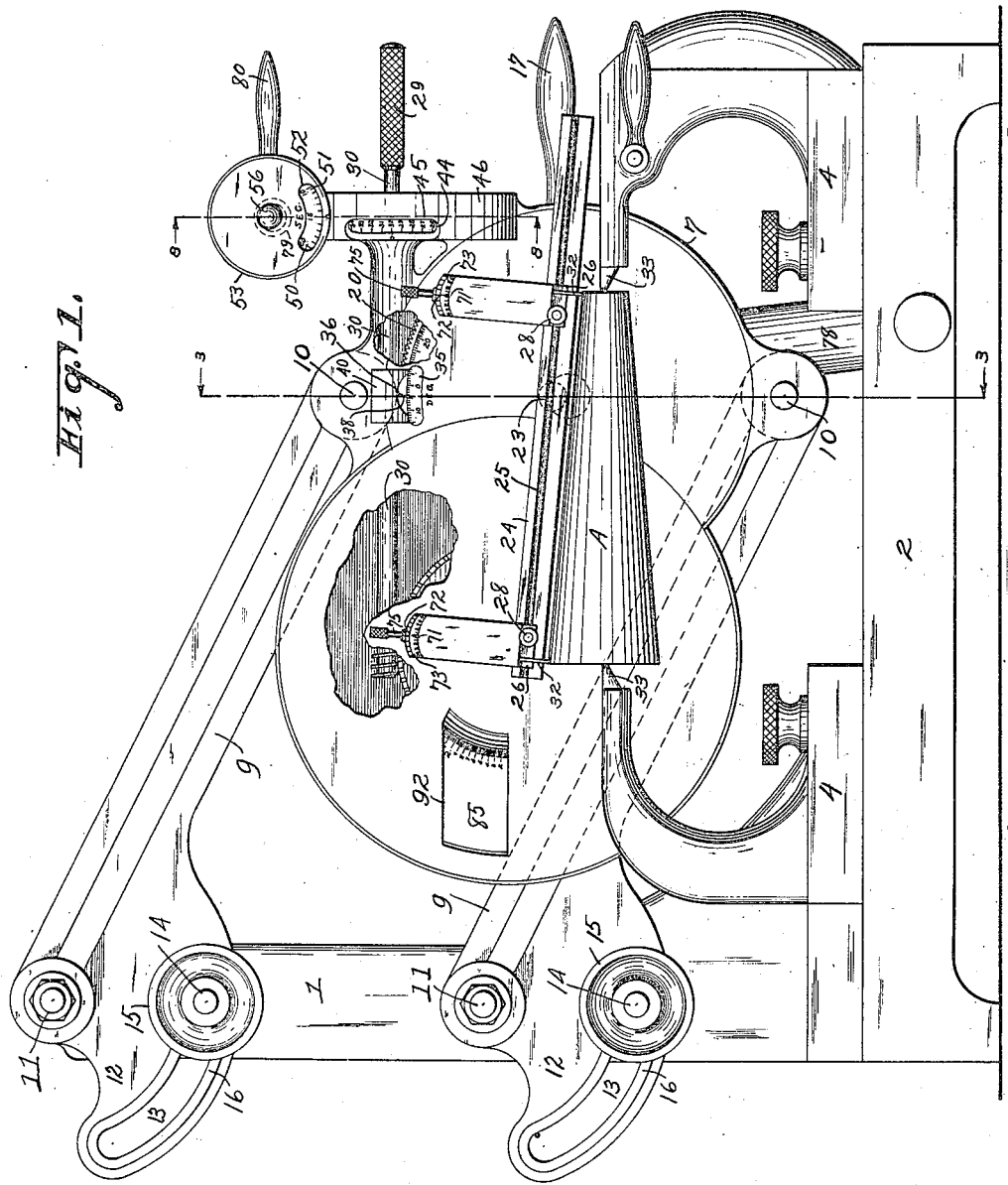

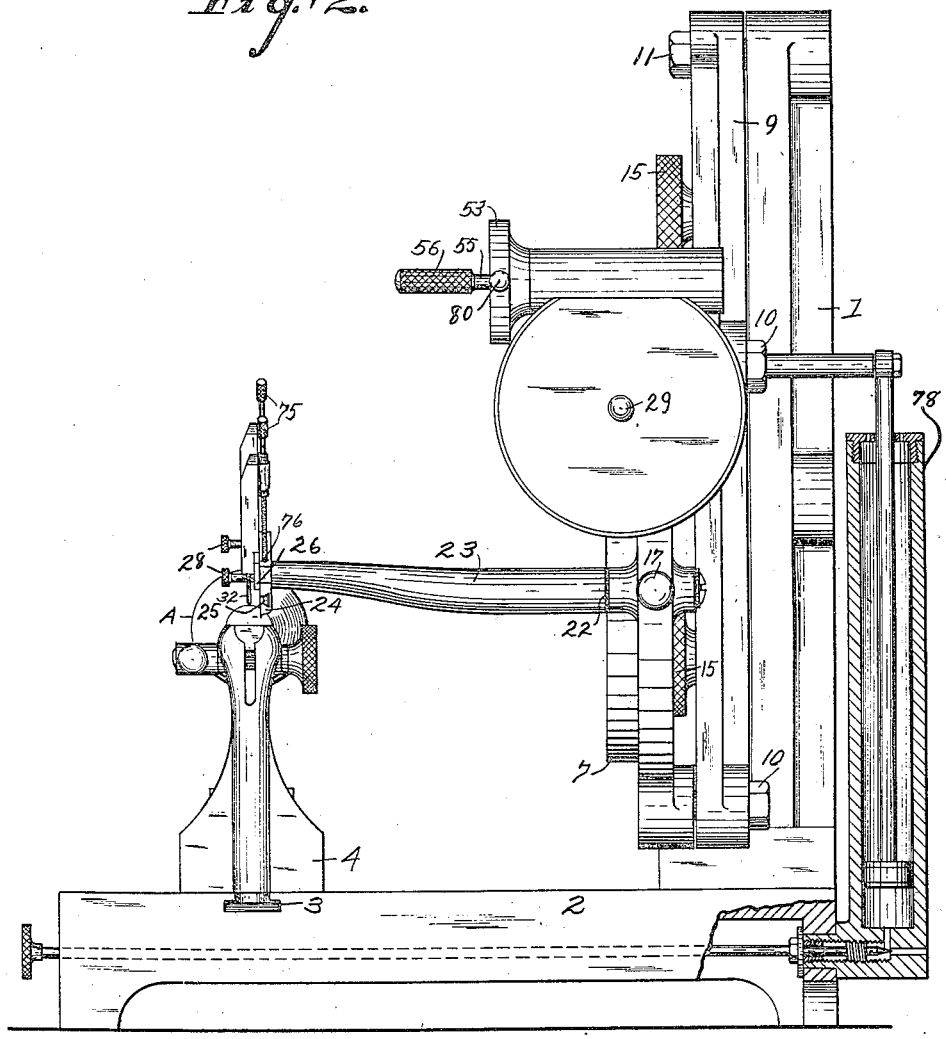

L. BROWN.
PRECISION GAGE.
APPLICATION FILED JUNE 21, 1919.

1,380,945.

Patented June 7, 1921.
4 SHEETS—SHEET 4.

Inventor
Levi Brown
By Erwin Wheeler & Woolard
Attorneys

Witness
F. A. Otto

UNITED STATES PATENT OFFICE.

LEVI BROWN, OF MILWAUKEE, WISCONSIN, ASSIGNOR OF ONE-HALF TO LLOYD McELWAIN, OF WALWORTH, WISCONSIN.

PRECISION-GAGE.

1,380,945.   Specification of Letters Patent.   Patented June 7, 1921.

Application filed June 21, 1919. Serial No. 305,835.

*To all whom it may concern:*

Be it known that I, LEVI BROWN, a citizen of the United States, residing at Milwaukee, county of Milwaukee, and State of Wisconsin, have invented new and useful Improvements in Precision-Gages, of which the following is a specification.

My invention relates to improvements in precision gages for measuring inclined or tapering surfaces.

The object of my invention is to provide an instrument of precision for measuring inclinations which will not only accurately indicate the degree of inclination, but will also automatically compute the variation from a horizontal line per foot or other unit of measurement.

A further object of my invention is to provide means whereby the gage may be readily manipulated into and out of contact with the work, and used in a manner suited to the requirements of modern machine-shop practice.

In the drawings:—

Figure 1 is a front elevation of a precision gage embodying my invention, with the casing partially broken away.

Fig. 2 is an end elevation of the same, with parts broken away in vertical section.

Fig. 3 is a sectional view, drawn on line 3—3 of Fig. 1.

Fig. 4 is a detail view of the rotary member of the vernier scale.

Fig. 5 is a detail view of the sliding member of the vernier scale.

Fig. 7 is a detail view of one of the high fraction indicators carried by the measuring bar, with the face plate removed to show the interior construction.

Fig. 8 is a sectional view, drawn on line 8—8 of Fig. 1.

Like parts are identified by the same reference characters throughout the several views.

Figure 14:
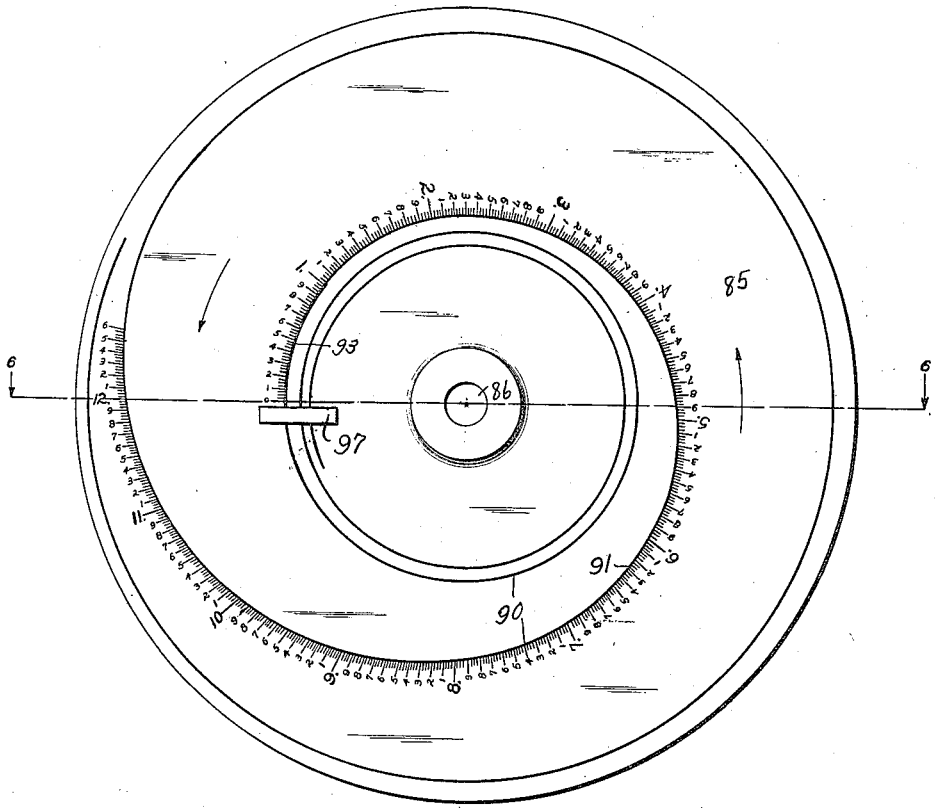
Figure 6:
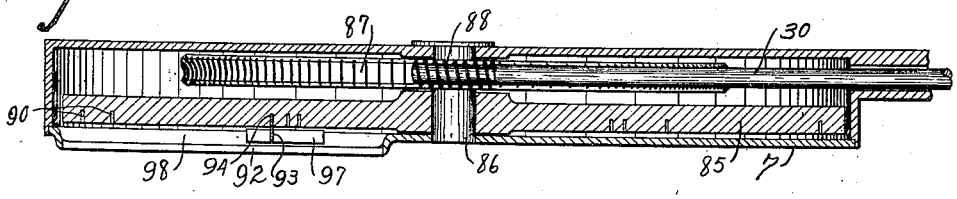
Fig. 6 is a sectional view, drawn on line 6—6 of Fig. 4.
Figure 9:
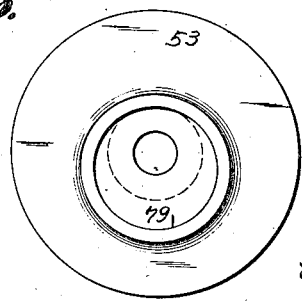
Fig. 9 is a detail view of the auxiliary casing for the worm wheel employed to register seconds.

The standard 1 is supported from a table 2 having guide channels 3 therein, adapted to receive adjustable work supports 4. The casing or frame 7 in which the index wheels and operating mechanism are mounted is connected with the standard 1 by parallel links 9, pivoted to the casing and the standard at 10 and 11 respectively, and provided with fan shaped arms 12 having arcuate slots 13, through which clamping screws 14 extend into threaded engagement with the standard. These screws 14 are provided with hand wheels 15, whereby they may be turned into and out of clamping or pressure engagement with the margins 16 of the arcuate slots 13 to lock or release the links 9. When the clamping screws 14 are loosened, the casing may be raised or lowered by means of a handle 17, and when the desired position is reached the screws 14 will be turned to clamping position, thereby locking the casing in the desired position of adjustment.

The casing is provided with a cylindrical recess to receive a worm wheel 20 supported within the casing by a shaft 21 which projects through the casing, and is shouldered at 22. The shaft projects beyond the shoulder 22 in the form of an arm 23, the outer end of which is upwardly inclined and rigidly secured to a gage bar 24. The gage bar 24 is provided with a longitudinally extending dove tail channel 25 in its front face, and a set of slides 26, each forming a part of a pressure indicator, hereinafter described, are each provided with a dove tailed member 27 fitting the channel 25, and adapted to guide its associated slide 26 along the bar 24. The set screws 28 may be utilized to lock the slides to the bar at any desired point of longitudinal adjustment.

The worm wheel 20 is actuated from a handle 29 through shaft 30 and worm 31, whereby the worm wheel shaft 21 may be oscillated to tilt the bar 24. It will be observed in Fig. 1 that the bar 24 is supported above the work supports 4, which are slidingly adjustable in the guide channel 3. In the drawings these work supports are illustrated as having centering pins 33 adapted to support a conically tapered member A in a position with its axis parallel to the work table, and in a plane which includes the axes of the gage pins 32 of the high fraction indicators connected with the slides 26, whereby when the bar 24 is tilted by the oscillation of shaft 21 and arm 23, as above explained, the gage pins 32 may each be brought into contact with the work, (the cone A), when bar 24 is parallel to a line in the surface of the cone lying in a plane which also includes the axis of the cone. The inclination of the bar 24 from the horizontal line of the cone axis will then correspond to the inclination of the cone surface.

*Indicator mechanism.*

It will be observed in Fig. 1 that the casing is provided with a slot at 35, exposing a portion of the side face of the worm wheel 20, which is provided with an arcuate scale 36, adapted to be progressively exposed through the slot 35 when the worm wheel is turned. The scale 36 indicates in degrees the inclination of the bar 24. When the bar 24 is in a true horizontal position, the zero mark on the scale will register with a suitable mark 38 carried by an overhanging arm 40, the scale value being indicated as extending progressively to the right and left from the zero mark on the worm wheel, whereby the wheel may be oscillated in either direction, and the corresponding degree of inclination of the bar 24 indicated.

In addition to indicating in degrees the inclination of the bar 24, I have also provided for indicating the minutes by means of a scale wheel 44, mounted directly on the shaft 30, and having peripheral scale marks exposed through a slot 45 in the casing member 46. The seconds may be indicated by a third wheel 50 provided with a scale 51 exposed through a slot 52 in the auxiliary casing member 53. The wheel 50 is mounted upon a shaft 55, the end of which is extended and provided with an operating handle 56. Shaft 55 is provided with worm threads 54 adapted to mesh with the threads of a worm wheel 57 on shaft 30, whereby after securing an approximate adjustment of bar 24, the handle 56 may be actuated to secure a more accurate adjustment than can be secured by turning the handle 29, the motion being transmitted from shaft 55 through worm 54, and worm wheel 57, to slowly rotate shaft 30. The index wheel 44 may be a part of the worm wheel 57, or it may be independently mounted upon shaft 30 as described.

During the adjusting operations above described, the clamping screws 14 will be in releasing position, and the casing 7 supported upon an air cushion from which the air may be slowly released to allow the gage pins to bear with the desired pressure upon the work in a vertical plane which includes the axis of the work, (if a cone). These pins 32 are each supported within a casing member 60 of the pressure leveling indicators with which they are associated.

Each pin 32 is yieldingly mounted within its associated casing, and adapted to slide axially therein through apertured guides 63 and 64. A coiled spring 65 has one end seated against the guide member 64, and at its other end bears against a collar 66, rigidly secured to the pin 32, whereby the spring tends to urge the pin downwardly until the collar 66 seats against the guide 63, which serves as a stop. But when the pin 32 is brought into contact with the work, and utilized to support the casing and its associated mechanism from the work, the pin 32 will tend to push upwardly within the casing member 60, thereby compressing spring 65, and also transmitting motion through bell crank 70 to actuate a pointer 71, and swing the same from the normal position, in which it is indicated in Fig. 7, the pointer moving along the face of the arcuate scale 73 toward and ultimately across zero mark 72.

It will be observed that the casing members 60 are supported from the slides 26 by adjusting screws 75 which have swivel connection at 76 with the respective casing members 60, and also have threaded engagement at their lower ends with the associated slides 26. In preparing the apparatus for use, the main casing and its contained mechanism will be supported by the pins 32 from the surface of a table, or from a surface previously ascertained to be a true horizontal surface. All of the scale wheels will be adjusted in zero position, and the screws 75 of the pressure indicators will then be turned until their pointers each register with the zero mark, thereby indicating that the load is equally divided between the two pins. The instrument will then be balanced, after which the main casing 7 may be raised and secured in the raised position by the clamping screws 14 to facilitate adjusting the slides 4 in position to support the work, and also securing the work to the slides in position for a measuring operation.

In the construction shown, the work will be supported with its upper surface inclined downwardly and in the direction away from the standard, its axis, if a cone, parallel with the horizontal upper surface of the table. If inclination is wholly on one side of the member to be measured, it will be supported with the inclined side uppermost, and the lower side will be supported from the table in any suitable manner calculated to insure that it is parallel with the table, or to establish an axis, or a base line from which the measurement is to be taken.

After the work has been secured in position for a measuring operation, the clamping screws 14 will be loosened, and the casing 7 lowered, its downward movement being preferably retarded by an air cushion stop 78 of any ordinary type commonly used to check the momentum of moving bodies.

The bar 24 having been adjusted in a horizontal position, and held in such position by the parallel links while the casing is being raised or lowered, it is obvious that if the surface to be measured is inclined, the outer pin 32 will first come in contact with the surface and support the mechanism therefrom. Thereupon, the operator will manually rotate handle 29 to oscillate the index wheel 20, and tilt the bar 24 until the other pin 32 is brought in contact with the work, or in substantial contact therewith. During this movement index wheel 50 will preferably be lifted slightly to disengage its worm teeth from worm wheel 57, the auxiliary casing 53 being eccentrically supported from the main casing by trunnion 79, and provided with a handle 80 to facilitate its manipulation. This is done for the reason that the worm 54 would otherwise interpose too great a resistance to the rotation of shaft 30.

After an approximate adjustment has been secured by rotating shaft 30, casing 53 will be swung to carry the worm 54 into operative relation to the worm wheel 57, and shaft 56 will be actuated for a final adjustment until the leveling indicator pointers are again brought to zero position showing that the pressure upon the pins 32 has been equalized. The reading of the scale wheels may then be taken.

*The inclination from an elevational standpoint.*

To indicate the inclination in inches or other unit of elevational measurement for each foot, or other standard of longitudinal measurement, I employ a vernier scale having one rotary member provided with a spiral index in its side face, and one sliding member controlled as to its movement by a spiral groove which follows the index on the rotary member.

This is accomplished in a simple manner by mounting the rotary member 85 of the vernier scale upon a shaft 86, which is provided with a worm wheel 87, having peripheral threads engaged by a worm 88 on the manually actuated shaft 30. The rotary member 85 is in the form of a disk having a spiral channel 90 in its front face along which the scale marks 91 are arranged. The portion of the casing 7 which incloses this index is provided with a rectangular opening 92, through which the scale may be viewed. The side margins of this opening serve as a guide for a flexible scale member 93, the inner margin 94 of which is adapted to be received in the spiral channel or groove 90, whereby when the disk is rotated the flexible scale member will be pushed outwardly or drawn inwardly, and its gage marks will be maintained in general registry with the gage marks on the disk. The registry of a gage mark on the disk with one of the marks on the flexible member will indicate the elevation of the high part of the cone for a given unit of its axial length.

The vernier scale illustrated is designed for measuring inclinations within angles of 45° from the horizontal surface of the table, and in cases where the inclination is upwardly in the direction of the standard. The channels in the rotary member of the vernier scale are extended to allow the tilting movements to continue if it is desired to utilize the index wheels independently of the vernier scale for measuring greater angles, or reversely inclined surfaces. The member 93 of the vernier scale has a sliding head 97 fitted to a guide 98 in the casing.

I claim:—

1. A precision gage including the combination of a gage bar, supported for oscillation about a transverse axis, and provided with projections adapted for contact with the work at a plurality of points, a manually rotatable shaft adapted to oscillate the bar about the said axis, and scale members operatively associated with said shaft and adapted to indicate the inclination of the bar from a normal horizontal position.

2. A precision gage including the combination of a gage bar, supported for oscillation about a transverse axis, and provided with projections adapted for contact with the work at a plurality of points, a manually rotatable shaft adapted to oscillate the bar about said axis, scale members operatively associated with said shaft and adapted to indicate the inclination of the bar from a normal horizontal position, and means for raising and lowering the bar without changing its inclination.

3. A precision gage including the combination of a gage bar, supported for oscillation about a transverse axis, and provided with projections adapted for contact with the work at a plurality of points, a manually rotatable shaft adapted to oscillate the bar about said axis, scale members operatively associated with said shaft and adapted to indicate the inclination of the bar from a normal horizontal position, means for raising and lowering the bar without changing its inclination, and supporting it at various levels while allowing it to tilt upon said axis.

4. A precision gage including the combination of a gage bar, supported for oscillation about a transverse axis, and provided with projections adapted for contact with the work at a plurality of points, a manually rotatable shaft adapted to oscillate the bar about said axis, scale members connected to operate simultaneously with said shaft and adapted to indicate the inclination of the bar from a normal horizontal position, and means for separately indicating the pressure of the projections upon the work.

5. A precision gage including the combination of a gage bar, supported for oscillation about a transverse axis, and provided with projections adapted for contact with the work at a plurality of points, a manually rotatable shaft adapted to oscillate the bar about said axis, and scale members operatively associated with said shaft and adapted to indicate the inclination of the bar from a normal horizontal position, both in degrees and in other units of measurement.

6. A precision gage including the combination with a table and a raised standard, of a gage bar, a support therefor in pivotal connection with the bar on an axis transverse thereto, parallel link connections between the support and the standard, adapted to swing in a vertical plane, means for locking said connections with the support in various positions of elevation above the table, a set of scale wheels mounted in the support, and operatively connected with the gage bar, a manually rotatable shaft in worm driving connection with the scale wheels, means for transmitting motion from said wheels to said gage bar, said wheels being adapted to indicate the angle of inclination of said bar.

7. A precision gage including the combination with a table and a raised standard, of a gage bar, a support therefor in pivotal connection with the bar on an axis transverse thereto, parallel link connections between the support and the standard, adapted to swing in a vertical plane, means for locking said connections with the support in various positions of elevation above the table, a set of scale wheels mounted in the support, and operatively connected with the gage bar, a manually rotatable shaft in worm driving connection with the scale wheels, means for transmitting motion from said wheels to said gage bar, said wheels being adapted to indicate the angle of inclination of said bar and said gage bar being provided with resiliently mounted adjustable members adapted for contact with the work, and arranged to indicate their relative pressure upon the work.

8. A precision gage including the combination with a table and a raised standard, of a gage bar, a support therefor in pivotal connection with the bar on an axis transverse thereto, parallel link connections between the support and the standard, adapted to swing in a vertical plane, means for locking said connections with the support in various positions of elevation above the table, a set of scale wheels mounted in the support and operatively connected with the gage bar, a manually rotatable shaft in worm driving connection with the scale wheels, means for transmitting motion from said wheels to said gage bar, said wheels being adapted to indicate the angle of inclination of said bar, an auxiliary manually operable shaft releasably connected with the first mentioned shaft through reduction gears adapted, when in operative position, for the transmission of slow movement to said first mentioned shaft, and provided with a scale adapted to coöperate with the first mentioned scale wheels by registering slight movements less accurately indicated by said wheels.

9. A precision gage including the combination with a work support, of a gage member adapted to be adjusted into contact with the surface of the work at a plurality of points, means connected with the gage member for indicating the degree of its inclination necessary to swing said members from a horizontal line into simultaneous contact with the work, and a coöperating elevational indicator adapted to show the inclination of said members.

10. A precision gage including the combination of a table, adjustable work supports thereon, and a raised standard connected therewith, a support having parallel link connection with the standard, and adapted to swing in a vertical plane above the work supports on the table, a gage bar connected with the swinging support, and adapted to oscillate about an axis transverse to said bar in a vertical plane which includes the longitudinal axis of the bar, point bearing members adjustably connected with the bar, and positioned for contact with work carried by said work supports, a scale wheel on the swinging support connected to oscillate said bar about its pivotal axis, and adapted to indicate in degrees the inclination of the surface of the work with which said point bearing members are in contact, an auxiliary scale wheel provided with a spiral groove in its side face, a scale following said groove, a vernier member loosely engaged in said groove, a guide therefor adapted to direct the same along a straight line toward or away from the periphery of said wheel, said vernier member having an index adapted for successive registry with the scale marks on the wheel, and a manually operable shaft in worm gear connection with the degree indicator wheel, and also with the spirally grooved vernier scale wheel.

11. A precision gage including the combination of a table, adjustable work supports thereon, and a raised standard connected therewith, a support having parallel link connection with the standard, and adapted to swing in a vertical plane above the work supports on the table, a gage bar connected with the swinging support, and adapted to oscillate about an axis transverse to said bar in a plane which includes the axis of the bar, said bar being provided with point bearing members positioned for contact with work carried by said work supports, a scale wheel on the swinging support connected to oscillate said bar about its pivotal axis, and adapted to indicate in degrees the inclination of the surface of the work with which said point bearing members are in contact, an auxiliary scale wheel provided with a spiral groove in its side face, a scale following said groove; a vernier member loosely engaged in said groove, a guide therefor adapted to direct the same along a straight line toward or away from the periphery of said wheel, said vernier member having a scale adapted for successive registry with the scale marks on the wheel, a manually operable shaft in worm gear connection with the degree indicator wheel and the spirally grooved vernier scale wheel, together with a set of auxiliary scale wheels, one mounted on said shaft and another in reduction gear connection therewith, and adapted to indicate fractions of degrees represented by marks on the degree indicator wheel.

12. In a precision gage the combination with an oscillatory gage member, adapted for contact with the work, of a vernier scale provided with one rotary member, and one reciprocating member, each having scale marks adapted for registry with those on the other member, means for actuating the oscillatory work engaging member, and connections for transmitting the actuating movement to the respective vernier scale members.

13. The combination with a work support, of an adjustable gage member provided with means for engaging the work at a plurality of points, means for registering inclinations of said gage member from a normal horizontal position, and means for raising and lowering the gage member, and securing it in various positions of adjustment without changing its inclination.

14. In a precision gage, the combination with an inclinable gage bar, of a set of adjustable work engaging members thereon, each yieldingly supported from the gage bar, and provided with means for indicating its relative degree of pressure upon the work, as compared with that of the other work engaging member.

15. A precision gage, including the combination of an oscillatory scale member, a supporting shaft therefor rigidly connected with said member, a bar connected with the shaft, and provided with a set of pressure indicators adapted for contact with the work to be measured, means for adjusting the pressure indicators to support equal parts of the weight of the mechanism from a horizontal surface, and means for manually actuating the scale member to tilt the bar, and bring said pressure indicators into contact with equal pressure upon an inclined surface.

16. In a precision gage the combination of an oscillatory gage member adapted to contact with the surface of the work, means for oscillating said gage member, and a plurality of means operatively associated with and controlled by the movement of said gage member to simultaneously indicate the inclination of the surface of the work both in degrees and in the ratio of the rise to the corresponding horizontal distance.

In testimony whereof I affix my signature in the presence of two witnesses.

LEVI BROWN.

Witnesses:
O. C. WEBER,
LEVERETT C. WHEELER.